July 24, 1962 L. M. HOUGH 3,045,827
BATCH TYPE FILTER SYSTEM AND VALVE FOR USE THEREWITH
Filed Oct. 6, 1958 2 Sheets-Sheet 1

INVENTOR.
Lewis M. Hough

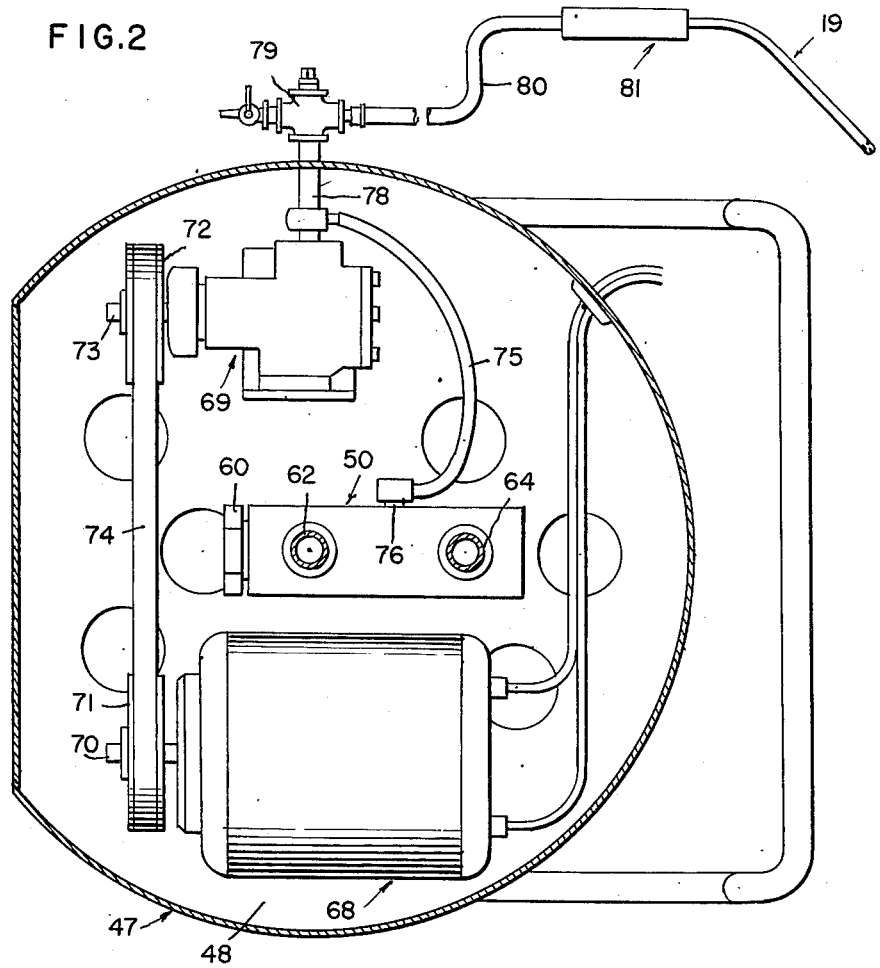
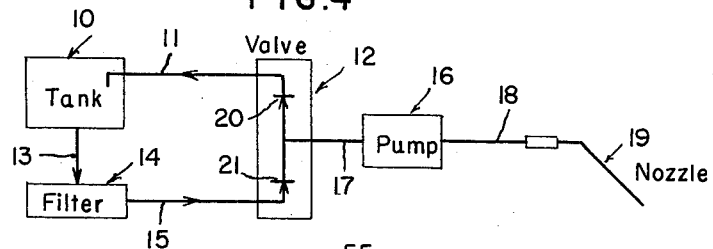
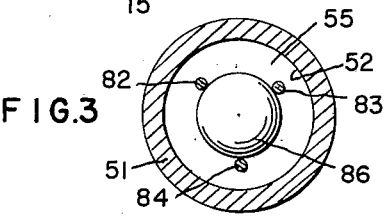
INVENTOR.
Lewis M. Hough

United States Patent Office 3,045,827
Patented July 24, 1962

3,045,827
BATCH TYPE FILTER SYSTEM AND VALVE FOR USE THEREWITH
Lewis M. Hough, Gastonia, N.C., assignor to Wix Corporation, Gastonia, N.C., a corporation of North Carolina
Filed Oct. 6, 1958, Ser. No. 765,480
9 Claims. (Cl. 210—110)

This invention relates to filtering systems in general and pertains more particularly to certain improvements therein including a novel type of valve for such systems.

Of primary concern in connection with this invention is the provision of an improved type batch filter which is of extremely compact form and which is characterized by its simplicity in mechanical detail and operation.

Another object of this invention is to provide a batch type filter system and more particularly resides in the provision of a valve utilized in association therewith, which valve incorporates check valve mechanisms for controlling the direction of flow of fluid therethrough and having associated therewith a reversible liquid pump so that when the pump is operated to force liquid into the system, the flow path will be in one direction and whereby when the pump is used to withdraw liquid from the system, the flow path will be in another direction.

Still another object of this invention is to provide a filtering system including a liquid receiving tank having a filter associated therewith and having first and second conduits for circulating liquid into and through the tank and, when circulating the liquid through the tank, to also pass the same through the filter and, in combination therewith, a valve assembly and a reversible liquid pump, the valve assembly being operative to control the flow path of the liquid such that when liquid is being circulated into the tank, the filter will be bypassed and wherein the liquid will be drawn through the filter when the liquid is withdrawn from the tank as effected by reversible operation of the pump.

A further object of this invention is to provide an improved valve for filtering systems which incorporates a hollow body having a pair of seats therein disposed in spaced-apart relationship and having a pump connected opening intermediate such seats, and there being ball check valves associated with each of the seats and passages for liquid beyond each of the valve seats so that reversible operation of an associated pump will effect different flow paths through the valve.

Still another object of this invention is to provide a batch type filter assembly which is mobile so that the assembly may be moved from place to place and which includes a flexible hose and nozzle assembly whereby the filter assembly may be used to withdraw contaminated liquids from tanks or the like and then the direction of flow reversed to effect a filtering action on the withdrawn fluid and to discharge it at any point or place desired.

Still another object of this invention is to provide a batch type filter which may be wheeled from place to place for operating upon reservoirs or tanks of contaminated fluid, the assembly being capable of operating in one flow direction to withdraw fluid from the associated reservoir or tank and also being operable in reverse direction to discharge the fluid to any desired point, for example, back into the reservoir or tank if so desired, the discharge fluid being automatically filtered as it is caused to flow in the discharge direction.

Of importance in connection with this invention, then, is to provide a system of filtering incorporating a reversible pump and in association therewith a check valve assembly for controlling the direction and paths of flow of liquid circulated by the pump as the same is operated in relatively reverse directions so that as the pump draws liquid into the system, the liquid will be passed directly to a storage tank or container and wherein the liquid will be passed through a filter upon the reverse direction of flow of the pump and while the same is being discharged from the system.

In the drawings:

FIG. 2 is a horizontal section taken substantially along the plane of section line 2—2 in FIG. 1 and further illustrating details of the arrangement of the component parts of the filter of this assembly;

FIG. 3 is an enlarged transverse section taken substantially along the plane of section line 3—3 in FIG. 1 showing details of the valve assembly; and FIG. 4 is a diagrammatic view of the filter system.

Figure 1:
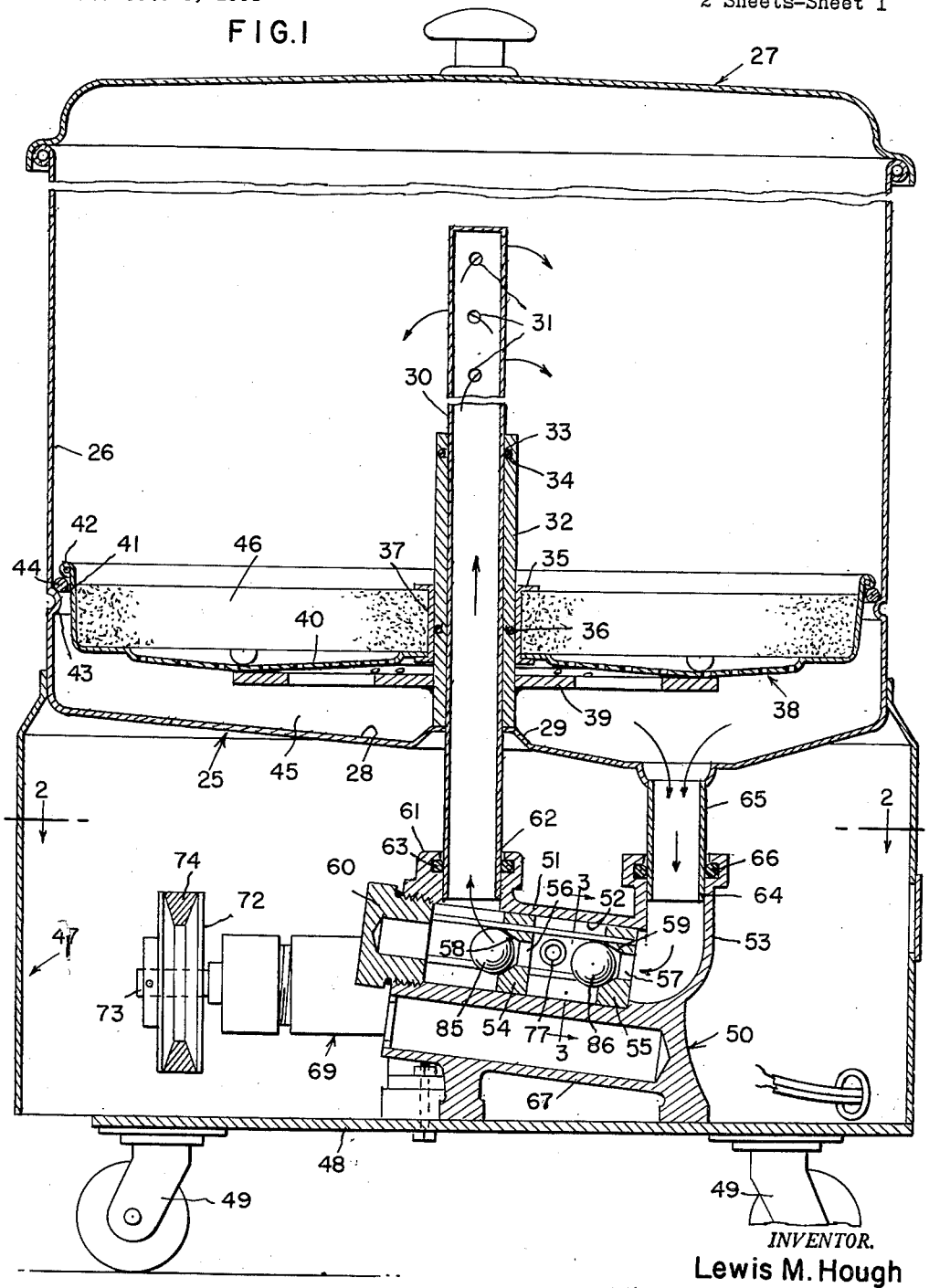
FIG. 1 is a vertical section taken through a batch filter constructed in accordance with this invention illustrating the arrangement of the component parts thereof and details of the valve associated therewith.

Referring at this time more particularly to FIG. 4, the reference numeral 10 indicates a tank connected through a fluid line 11 to a valve assembly indicated generally by the reference character 12 and also connected through a fluid line 13 to a filter assembly indicated generally by the reference character 14 which is in turn connected to the valve through the line 15. A reversible liquid pump indicated generally by the reference character 16 is connected by line 17 to the valve and has a further line 18 extending therefrom and which is mounted in nozzle indicated generally by the reference character 19. The valve assembly 12 has two check valves 20 and 21 associated therewith permitting flow of fluid in the direction indicated by the arrows in FIG. 4.

The system, as can be seen from FIG. 4, is such that when the pump 16 is operated to direct liquid into the tank 10, the flow of liquid will be upwardly through the valve assembly through the check valve 20, the check valve 21 being seated and preventing flow of liquid therethrough, and thence through the line 11 into the tank 10 until a sufficient and desired quantity of liquid has been pumped into the tank.

In use, the device is wheeled to any desired point as, for example, adjacent a tank of liquid which during use has been contaminated with foreign material to such an extent that it is no longer usable. At this time, the pump 16 is operated in a direction to draw fluid from the reesrvoir or receptacle within which the contaminated fluid or liquid is contained and to pump the same into the tank 10. Then, upon reverse operation of the pump 16, the controlled liquid in the tank 10 will be drawn through the filter 14, the line 15 and check valve 21 and through the pump for discharge through the nozzle 19 into any desired or suitable receptacle as, for example, back into the receptacle within which the contaminated fluid was contained. The discharged liquid will thus have been filtered and may now be reused until further contamination requires repetition of the above described operation.

It is to be understood that the diagrammatic showing of FIG. 4 is illustrative of the principles of the invention only. In this regard, the tank 10 and filter 14 may be entirely separate and distinct units or they may be integrated into a single mechanism. Preferably, as is illustrated in FIGS. 1 and 2, the latter is employed.

In FIGS. 1 and 2, the filter assembly in general is indicated by reference character 25 and includes a tank or housing 26 having a removable cover or top 27. The bottom wall 28 of the tank is provided with a generally centrally disposed boss 29 to which a stand pipe 30 is rigidly affixed and which stands upwardly within the confines of the tank to terminate in an upper end having openings or discharge ports 31 therein.

Fitted around the stand pipe 30 is a sleeve 32 having an internal groove 33 adjacent its upper end having an O-ring sealing member 34 fitted therewithin and sealingly engaged against the outer surface of the stand pipe and also provided with an annular groove 35 in its outer surface adjacent the lower end thereof receiving a further O-ring sealing member 36 cooperating with the hub 37 of a filter pan indicated generally by the reference character 38.

A supporting plate 39 is fixed to the sleeve 32 that serves to support the filter pan in part. The pan 38 is removable from the sleeve and is composed of a bottom wall 40 and an annular upstanding side wall 41 terminating at its upper edge in the rolled flange or shelf 42 projecting laterally beyond the confines of the side wall 41.

The housing or tank 26 is provided with an inwardly directed annular flange or shelf 43 and interposed between these two shelf members 42 and 43 is an annular sealing ring 44 of resilient material.

The disposition of the member 39 is such as to permit a slight compression of the sealing member 44 so that liquid contained within the tank 26 above the filter cannot pass into the chamber 45 within the tank below the filter without passing through the filter element 46 which is disposed within the pan 38. It is to be understood that the bottom wall 40 of the filter pan is perforated so as to permit the liquid to flow therethrough after having passed through the filter element 46.

The filter assembly also includes a base indicated generally by the reference character 47 and upon which the tank 26 is supported, as shown. The base includes a platform 48 having a plurality of supporting wheels 49 preferably of the caster type, for movably supporting the entire assemblage.

Supported on the base 48 which is, incidentally, integrally joined with the remaining portion of the base, is a valve assembly indicated generally by the reference character 50 including an elongate body portion 51 having a longitudinal bore 52 thereinto and intersecting at one end with a vertically directed elbow portion 53 as shown most clearly in FIG. 1. Fitted within the bore 52 are a pair of check valve seats 54 and 55 each having openings 56 and 57 therethrough and the tapered seat portions 58 and 59. The end of the bore 52 opposite the elbow nipple 53 is internally threaded to receive the plug element 60.

Between this plug element and valve seat 54 is a vertically extending nipple 61 which receives the lower end 62 of the stand pipe 30 which projects below the tank 26, there being suitable sealing means 63 to effect a fluid-tight seal.

Similarly, the nipple 53 receives the lower end portion 64 of a drain pipe 65 rigid with the bottom wall 28 of the tank and which has sealing means 66 associated therewith. The valve assembly 50 includes a foot or mounting portion 67 by means of which it is rigidly affixed to the platform 48 substantially in the manner shown.

Referring at this time more particularly to FIG. 2, it will be seen that the reversible electric motor indicated generally by the reference character 68 is also mounted on the platform 48 to one side of the valve assembly 50 and that on the opposite side of the valve assembly there is mounted a reversible pump indicated generally by the reference character 69. The drive shaft 70 of the motor 68 carries a pulley 71 aligned with the pulley 72 on the input shaft 73 of the pump 69 and a suitable belt or the like 74 interconnects the motor with the pump for driving the same.

The pump is connected by a flexible line 75 to the body of the valve assembly 50, the valve being provided with a nipple 76 for this purpose and which nipple communicates with a combined supply and exhaust port 77, see particularly FIG. 1, which is intermediate the two valve seats 54 and 55. Further, the pump is connected through a pipe 78 having a valve 79 associated therewith and a flexible line 80 to the nozzle assembly indicated generally by the reference character 81.

As can be seen most clearly in FIG. 3, the valve seats 54 and 55 carry three circumferentially spaced rods 82, 83 and 84 which extend therebetween and beyond the valve seat 54 toward the plug 60, these rods forming a cage for captivating the ball check valves 85 and 86 which are cooperable with the seats 54 and 59 to block the flow of liquid in accordance with the flow thereof as dictated by the direction of rotation of the motor 68.

From FIG. 1 it will be appreciated that the port 77 being intermediate the two valve seats 54 and 55, can cause the flow of liquid through only one or the other of the valve seats 54 and 55 at any one particular time depending upon the direction of rotation of the motor 68 and consequently the flow imparted by the pump 69. If the flow of liquid is into the valve assembly through the port 77, the ball check valve 86 will be closed precluding any flow of liquid through the drain pipe 65 and will unseat the ball check valve 85 and cause the incoming liquid to flow upwardly through the stand pipe and into the tank. Conversely if the liquid is being educted through the port 77, this will close the ball check valve 85 and unseat the ball check valve 86 withdrawing the liquid down through the drain pipe 65, the elbow 53 and out through the port 77. In this manner, whenever liquid is withdrawn from the tank, it must pass through the filter body 46 for removal of foreign material therefrom and by simply reversing the direction of rotation of the pump, as desired, the tank can be either filled or drained through the nozzle 81.

The entire assemblage is self-contained and is of very compact form, the only external part being the flexible line 80 and the associated nozzle 81 can be conveniently transported along with the tank and the base assembly itself for disposition at whatever location is desired. No external source of power, outside of the necessary electrical connection, is needed nor are there any external fluid lines or conduits which must be disconnected when the location of the assemblage is changed.

I claim:

1. A filtering system comprising a liquid receiving tank having a filter associated therewith, first and second conduits for circulating liquid into and through said tank, the first conduit connected to said tank remote from said filter and said second conduit connected to the tank such that liquid flowing between the two conduits passes through said filter, a valve assembly connecting said conduits exteriorly of said tank, a reversible liquid pump connected to said valve assembly, said valve assembly including a pair of freely rectilinearly movable fluid actuated check valves such that the pump forces liquid into the system through said first conduit in response to operation of the pump to effect liquid flow in one direction and removes liquid from the system through said second conduit in response to operation of the pump to effect liquid flow in the opposite direction.

2. A filtering system comprising a liquid circulating pump, means for driving said pump in opposite directions for reversing the direction of circulation of the pump, said pump having two liquid lines connected thereto selectively acting as inlet and discharge lines in accordance with the direction of rotation of the pump, a valve unit connected to one of said lines, said valve unit including a body having a liquid passageway therein and a pair of check valves in such passageway, said one line being connected to said valve unit at a point between said check valves and said check valves being unseated in the same linear direction such that operation of said pump will unseat one or the other of said check valves only, dependent upon the direction of flow imparted by the pump, said valve body having discharge and inlet ports respectively beyond said check valves, and a liquid container and filter unit, said outlet port being connected to the container and filter unit to discharge liquid thereinto without passing through the filter, the inlet port being connected to the container and filter unit to withdraw liquid therefrom through the filter.

3. A self-contained and portable filtering unit, comprising a movable base, a tank supported on said base, a filter assembly received in said tank in the lower portion thereof, a liquid pump and reversible drive means therefor mounted on said base below said tank, a valve unit mounted on said base below said tank, a liquid conveying line extending between said pump and said valve unit and a second liquid conveying line connected to said pump and extending exteriorly of the base, said valve unit including a pair of check valves disposed on opposite sides of the point of connection of the first liquid conveying line to the valve unit and having inlet and discharge ports beyond the respective check valves, said discharge port being connected to said tank for discharging liquid thereinto above said filter unit, and said discharge port being connected to the tank below said filter unit, said check valves being so oriented as to open alternately, dependent upon the direction of flow imparted to the circulating liquid by said pump and its associated drive means.

4. A filtering system comprising a circulating pump, means for driving said pump in relatively opposite directions for reversing the flow effected by the pump, said pump having a first outlet and a second outlet, a valve assembly connected to said second outlet having an inlet conduit and a discharge conduit, said discharge conduit being connected to a liquid receiving tank and said inlet conduit being connected to a filter unit, and the tank and filter unit being interconnected for flow of liquid therebetween, said valve assembly including check valve means therewithin for permitting flow of liquid therethrough only to said tank when said pump is effecting circulation of liquid into the valve assembly and for circulating liquid only through the inlet conduit when the pump is withdrawing liquid through the valve assembly.

5. A filtering system comprising a tank and a mobile supporting base for said tank, said tank being secured to said base in elevated position so as to leave a space below the tank within the base, a liquid pump mounted on the base below the tank and having means for driving the same in relatively opposite directions of liquid flow, a valve assembly mounted on said base below the tank and having inlet and outlet ports directly below the tank, a discharge conduit connected to said outlet port and extending upwardly through and into said tank for discharging liquid thereinto adjacent the upper region of the tank, a discharge conduit interconnecting the bottom of said tank with said inlet port, a filter assembly supported in said tank in spaced relation to the bottom thereof, and check valve means in said valve body for controlling the flow of liquid into and out of said tank through the inlet and discharge conduits, said pump having a conduit connecting the same to said valve body, and said check valve means being located on opposite sides thereof and operative to be seated in the same relative direction whereby flow of liquid into the body will cause unseating of only one of said check valves to direct fluid through the inlet conduit and an opposite direction of liquid flow will seat the other check valve means to effect flow of liquid out of said tank through said discharge conduit.

6. A filter structure comprising a receptacle, a filter cartridge therein cooperating with the wall of the receptacle to divide the receptacle into a first portion for receiving unfiltered liquid and a second portion for receiving filtered liquid, a supporting base for the receptacle, a reversible pump supported on said base and driving means therefor for operating the pump in relatively opposite directions, a fully fluid actuated valve assembly mounted on said base and having an outlet, an inlet and a supply-exhaust port, the supply-exhaust port being connected to said pump and the outlet and inlet being connected to said receptacle for respectively discharging liquid into said first portion of the receptacle and withdrawing liquid from the said second portion of the receptacle.

7. The assembly as defined in and by claim 6, wherein said fluid actuated valve assembly includes free moving check valve elements therein for controlling the flow of liquid therethrough to effect only the discharge of liquid into the receptacle or withdraw liquid from the receptacle at any one time dependent upon the relative drive imparted to said pump.

8. A filter structure comprising a receptacle of generally cylindrical form, the receptacle having a bottom wall, an inwardly directed circumferentially extending bead on the inner surface of said receptacle intermediate the opposite ends thereof, a filter element disposed within said receptacle and having a peripheral edge overlying said bead, gasket means sandwiched between said marginal edge of the filter element and said bead whereby the receptacle is divided into upper and lower chambers, a base upon which said receptacle is mounted, a reversible pump supported on said base and driving means therefor for operating the pump in relatively opposite directions to effect corresponding liquid flow in opposite directions through the pump, a valve assembly mounted on said base connected to said pump and having an outlet and an inlet connected to said receptacle through the bottom wall thereof respectively above and below said filter element for selectively discharging liquid into the upper chamber in response to one direction of flow through the pump and for withdrawing liquid from the lower chamber upon the opposite direction of flow imparted by said pump.

9. The assembly as defined in and by claim 8 wherein said filter element is of annular configuration, the connection from said valve assembly to said upper chamber extending centrally upwardly through said annular filter element.

References Cited in the file of this patent

UNITED STATES PATENTS

| | | |
|---|---|---|
| 635,117 | Acker | Oct. 17, 1899 |
| 921,594 | Crane | May 11, 1909 |
| 1,764,160 | Finch | June 17, 1930 |
| 1,808,125 | Weissfloch | June 2, 1931 |
| 1,826,015 | Morton | Oct. 6, 1931 |
| 1,851,927 | McCord | Mar. 29, 1932 |
| 2,033,355 | Peterson | Mar. 10, 1936 |
| 2,864,312 | Shelton et al. | Dec. 16, 1958 |
| 2,910,942 | Thorman | Nov. 3, 1959 |